F. T. WOOD.
WHIP SOCKET.
APPLICATION FILED MAR. 9, 1909.
937,200.
Patented Oct. 19, 1909.
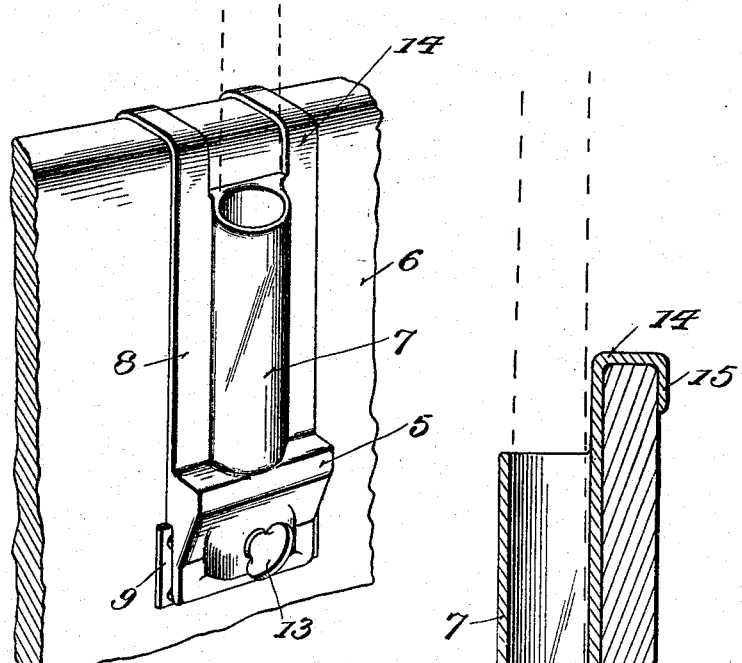
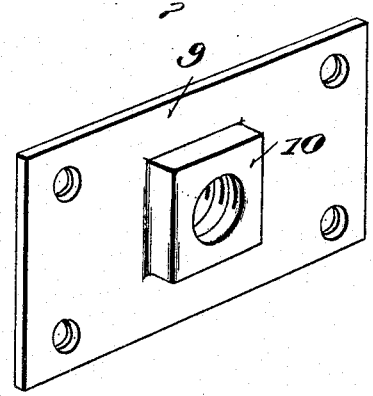
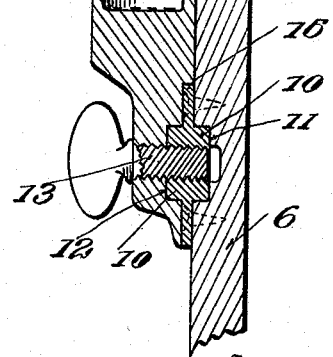
Witnesses
Inventor
Floyd T. Wood.
By
Attorneys,

UNITED STATES PATENT OFFICE.

FLOYD T. WOOD, OF LIDGERWOOD, NORTH DAKOTA.

WHIP-SOCKET.

937,200.  Specification of Letters Patent.  Patented Oct. 19, 1909.

Application filed March 9, 1909. Serial No. 482,225.

*To all whom it may concern:*

Be it known that I, FLOYD T. WOOD, subject of the King of England, residing at Lidgerwood, in the county of Richland and State of North Dakota, have invented certain new and useful Improvements in Whip-Sockets, of which the following is a specification.

This invention relates to whip sockets, and has for its object to provide a comparatively simple and inexpensive device of this character, particularly designed for attachment to farm wagons and other vehicles, and by means of which a whip may be retained in convenient position for use by the driver.

A further object of the invention is to provide a whip socket including a body portion having spaced clamping members on one end thereof for engagement with the upper portion of a wagon body, and provided at its opposite end with means for locking the socket in position on said wagon body.

A still further object of the invention is generally to improve this class of devices so as to increase their utility, durability and efficiency, as well as to reduce the cost of manufacture.

For a full understanding of the invention and the merits thereof, and to acquire a knowledge of the details of construction, reference is to be had to the following description and accompanying drawing, in which:

Figure 1 is a perspective view of a whip socket constructed in accordance with my invention, showing the same applied to a wagon body; Fig. 2 is a vertical sectional view of the same; and, Fig. 3 is a perspective view of the attaching plate removed from the wagon body.

Corresponding and like parts are referred to in the following description and indicated in all the views of the drawing by the same reference characters.

The improved whip socket forming the subject-matter of the present invention, comprises a body portion 5, preferably cast or otherwise formed of metal and adapted to be supported on the body of a wagon or other vehicle indicated at 6.

The member 5 is provided with a longitudinally disposed enlargement 7, the central portion of which is cored out to form a socket for the reception of a whip indicated in dotted lines in Figs. 1 and 2 of the drawing, there being relatively thin flanges 8 disposed on opposite sides of the enlargement 7 and adapted to bear against the adjacent exterior wall of the wagon body, as shown.

Secured to the wagon body or box 6 is a plate 9 having a thickened angular portion or boss 10, one end of which is seated in a correspondingly shaped opening 11 of the wagon box, while the other end thereof is projected laterally beyond the adjacent face of the plate, and is arranged to register with another recess 12 in the lower portion of the member 5, when the latter is positioned on said wagon body. The boss 10 is interiorly threaded for engagement with a threaded clamping bolt 13 which latter passes through an opening in the lower end of the member 5 for the purpose of clamping said member in position on the wagon body.

The flanges 8 are extended longitudinally beyond the adjacent end of the enlargement 7 to form spaced clamping members 14, the free ends of which are bent laterally and downwardly to produce depending lips 15 adapted to bear against the inner face of the body portion 6, at the upper longitudinal edge thereof, and thus prevent accidental displacement of the whip socket.

Attention is here called to the fact that the rear face of the member 5, at the lower end thereof, is cut away to form a shoulder 16 which bears against the upper longitudinal edge of the plate 9 when the clamping members 14 are in engagement with the wagon body, thereby to assist in alining the boss 10 and recess 12, to permit the introduction of the clamping member or bolt 13. The cut-away portion of the member 5 also accommodates the plate 9 so as to allow the member 5 to rest flat against the adjacent side of the wagon body, as best shown in Fig. 2 of the drawing.

In order to position the whip socket on the body of the wagon, it is merely necessary to place the clamping members 14 over the upper longitudinal edge of the body portion, and then press the lower portion of the member 5 laterally against the adjacent side of the plate 9, when the recess 12 will register with and receive the boss 10 so as to permit the ready insertion of the bolt 13 for the purpose of clamping the lower portion of the member 5 on said wagon body.

To remove the socket, it is merely necessary to unscrew the bolt 13 and swing the lower end of the member 5 outwardly, the depending lips 15 of the clamping members forming, in effect, pivots so that by exerting a slight upward movement on the member 5, the lips 15 will be readily detached from the wagon body.

The whip socket may be made in different sizes and shapes, and nickeled, japanned or otherwise coated so as to give the same a neat and ornamental appearance, and also to assist in protecting the same against the action of the elements.

Having thus described the invention, what is claimed as new is:—

1. The combination with a support, of a plate secured to the body portion and provided with a boss having an interiorly threaded opening, a whip socket detachably secured to the support and including a tubular body portion provided at its lower end with an opening for registration with the opening in the boss, clamping members secured to the upper end of the body portion for engagement with the adjacent edge of the support, and a fastening device extending through the opening in the body portion and engaging the threaded walls of the boss for locking the whip socket in position on said plate.

2. The combination with a support, of a whip socket detachably secured to the support and including a tubular body portion provided with flat oppositely disposed flanges arranged to bear against the adjacent side of the support and terminating in clamping members adapted to embrace one edge of said support, there being an opening formed in the end of the body portion, and a fastening device extending through the opening in the body portion for engagement with the support for locking the whip socket in position thereon.

3. The combination with a support, of a plate secured thereto and provided with a perforated boss, a whip socket including a body portion bearing against the support and provided at one end with a recess for the reception of the boss, a clamping member depending from the other end of the body portion for detachable engagement with the adjacent edge of the support, and means extending through the opening in the socket and perforation in the boss for locking the whip socket in position on said support.

4. The combination with a support having a plate secured thereto and provided with an angular boss projecting laterally from opposite sides of the plate, of a whip socket including a body portion bearing against the support and having its rear face provided with a shoulder adapted to bear against the adjacent edge of the plate, there being a recess formed in the body portion adjacent said shoulder for the reception of the adjacent end of the boss, a clamping bolt extending through the whip socket and engaging the boss, and clamping members carried by the body portion and adapted to embrace the edge of said support.

5. The combination with a support having an opening therein, of a plate secured to the support and having an angular boss seated in the opening in the support and provided with a threaded opening, a whip socket comprising a body portion arranged to bear against the support and provided with an angular recess for the reception of the adjacent end of said boss, a clamping screw piercing the body portion and engaging the threads of the boss, and spaced clamping members secured to the upper end of said body portion and adapted to embrace the adjacent edge of said support.

6. The combination with a support, of a whip socket secured to the support and comprising a tubular body portion having flat oppositely disposed flanges arranged to bear against the adjacent side of the support, the free ends of said flanges being extended longitudinally beyond the adjacent end of the body portion, and thence bent laterally and downwardly to form spaced depending lips for detachable engagement with the adjacent edge of the support, and means carried by the opposite end of the body portion and engaging the support for locking the whip socket in position thereon.

In testimony whereof I affix my signature in presence of two witnesses.

FLOYD T. WOOD. [L. S.]

Witnesses:
 C. N. WOOD,
 W. I. IRVINE.